C. A. WARREN.
ANTISKID DEVICE.
APPLICATION FILED DEC. 6, 1919.
1,371,956.
Patented Mar. 15, 1921.
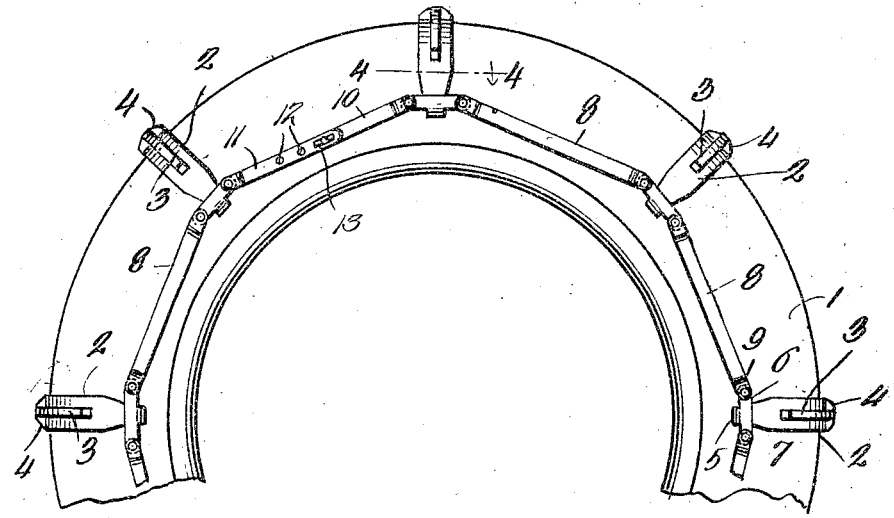
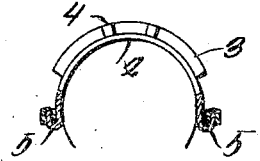
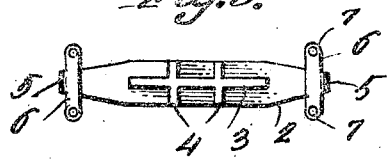
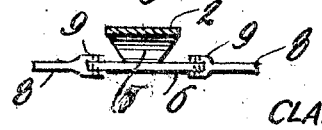
WITNESSES
Guy M. Spring
J. P. Campbell
Inventor
CLARENCE A. WARREN
By Richard B. Owen
Attorney

UNITED STATES PATENT OFFICE.

CLARENCE A. WARREN, OF INDEPENDENCE, MISSOURI.

ANTISKID DEVICE.

1,371,956.

Specification of Letters Patent. Patented Mar. 15, 1921.

Application filed December 6, 1919. Serial No. 342,868.

*To all whom it may concern:*

Be it known that I, CLARENCE A. WARREN, a citizen of the United States, residing at Independence, in the county of Jackson and State of Missouri, have invented certain new and useful Improvements in Antiskid Devices, of which the following is a specification.

My invention relates to new and useful improvements in an automobile wheel attachment and more particularly to an antiskid device.

The principal object of the invention resides in the provision of a device of this character which may be easily placed upon the wheel or removed therefrom.

Another object of the invention consists in making the device adjustable so that it may be adapted for wheels of various diameters.

A further object consists in making the device flexible so that it will easily conform to the curvature of the tire and when removed may be folded to be stored in a small space.

Still another object resides in constructing the sections of the device so that they may be connected in such a manner as not to unduly wear the surface of the tire.

With these and other objects in view my invention consists in the novel details of construction and arrangement of parts which will be more clearly understood from the following specification and drawings in which—

Figure 1 is a side elevation showing my attachment in position upon a tire.

Fig. 2 is an end view of one of the plates partly in section.

Fig. 3 is a top plan of one of the plates, and

Fig. 4 is a section on the line 4—4 of Fig. 1 looking in the direction of the arrows.

In the drawings the numeral 1 indicates a tire upon which my anti-skidding device is to be applied. The anti-skidding device is made up of a plurality of plates 2 which are circumferentially spaced upon the tire and connected in a manner to be later described. A transversely extending rib 3 is formed on the top of each plate 2 and longitudinally extending ribs or lugs 4 are formed intermediate the ends of the plates and extend from the transverse rib 3 to the edges of the plate. As indicated the tops of the ribs or lugs 4 are beveled or inclined toward the edges of the plate.

Each end of the plates 2 is bent upwardly as indicated at 5 and these upturned portions 5 are spaced from the plate 2 as more particularly illustrated in Figs. 2 and 4 of the drawings. A right angled extension 6 is formed on each side of the upturned portion and each right angled extension has a pin 7 extending therethrough, adjacent the end, for a purpose to be later described. As more particularly illustrated in Figs. 1 and 3 of the drawings the right angled extensions 6 project beyond the edges of the plates 2.

The circumferentially spaced plates 2 are adapted to be connected together by means of the bars 8 which have each end forked as indicated at 9 in Fig. 4 of the drawings. The forked ends 9 are provided with openings adapted to fit over the pins 7 carried by the right angled extensions 6. As more particularly illustrated in Fig. 4 of the drawings the forked ends 9 engage each side of the extensions 6 and, as stated, the pins 7 project in openings formed in these forked ends. The bars 8 are loosely connected on the pin 7 so that the several parts may be swung to conform to the curvature of the tire and at the same time when removed the parts may be folded.

For connecting the ends of the anti-skid device I provide the bars 10 and 11 each of which has a forked end so as to engage one of the right angled extensions 6 as more particularly illustrated in Fig. 1 of the drawings. The bar 11 is provided with a plurality of longitudinally spaced openings 12 adapted to receive a pin carried by the bar 10. The pin, if desired, may be threaded so as to receive a thumb nut 13 for securing the ends of the bars 10 and 11 together.

From the above detailed description it is thought that the manner of using my device as well as the advantages will be clearly understood. It will be seen that I have provided an anti-skidding device which may be readily connected to the tire or removed therefrom. At the same time by the provision of the longitudinally spaced openings 12 in the connecting bar 11 the anti-skidding device may be adjusted to adapt itself to tires of various diameters. I wish to lay particular stress upon the fact that the ends of the plates 2 being bent upwardly as indicated at 5 will space the right angled projections 6 and bars from the sides of the tire so that undue wear will be prevented. The only parts which actually engage the tire are the under surfaces of the plates 2. These surfaces being perfectly smooth will prevent wear upon the tire. The ribs 3 and 4 engage the ground to prevent skidding either longitudinally or transversely.

My anti-skid device will be of particular use in mud or where the ground is covered with snow or ice.

The foregoing description and the drawings have reference to what may be considered the preferred, or approved, form of my invention. It is to be understood that I may make such changes in construction and arrangement and combination of parts, materials, dimensions, etc., as may prove expedient and fall within the scope of the appended claims.

Having thus fully described my invention what I claim as new and desire to secure by Letters Patent is:—

1. An anti-skid device comprising a plurality of plates having upturned ends, right angled extensions formed on the upturned ends, and means connected to the right angled extensions for connecting the plates.

2. An anti-skid device comprising a plurality of plates having their ends upturned, right angled extensions formed on the upturned ends, pins carried by the right angled extensions, and bars pivotally connected to the pins for connecting the plates.

3. An anti-skid device comprising a plurality of plates having their ends upturned, pins carried by the upturned ends, and bars for connecting the plates, said bars having their ends forked so as to engage each face of the upturned portions and hingedly connected to the pins.

In testimony whereof I affix my signature in presence of two witnesses.

CLARENCE A. WARREN.

Witnesses:
Mrs. H. J. WARREN,
FRED D. WARREN.